United States Patent
Benayoun et al.

(10) Patent No.: US 6,904,046 B2
(45) Date of Patent: Jun. 7, 2005

(54) SELF-ROUTE MULTI-MEMORY PACKET SWITCH ADAPTED TO HAVE AN EXPANDABLE NUMBER OF INPUT/OUTPUT PORTS

(75) Inventors: Alain Benayoun, Cagnes sur Mer (FR); Patrick Michel, La Gaude (FR); Gilles Toubol, Villeneuve Loubet (FR)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 09/683,430

(22) Filed: Dec. 28, 2001

(65) Prior Publication Data
US 2002/0146033 A1 Oct. 10, 2002

(30) Foreign Application Priority Data
Dec. 28, 2000 (EP) .............................. 00480133

(51) Int. Cl.[7] .............................................. H04L 12/28
(52) U.S. Cl. ...................... 370/414; 370/236; 370/370; 370/389
(58) Field of Search ................................. 370/236, 380, 370/414, 389, 392, 370, 413, 416, 418

(56) References Cited
U.S. PATENT DOCUMENTS 5,237,565 A * 8/1993 Henrion et al. ............. 370/236
5,285,444 A * 2/1994 Sakurai et al. .............. 370/396
5,361,255 A * 11/1994 Diaz et al. .................. 370/374
5,636,210 A * 6/1997 Agrawal ..................... 370/390
6,195,335 B1 * 2/2001 Calvignac et al. .......... 370/236
6,449,274 B1 * 9/2002 Holden et al. .............. 370/392

* cited by examiner

*Primary Examiner*—Afsar Qureshi
(74) *Attorney, Agent, or Firm*—Anthony J. Canale; Michael J. LeStrange

(57) ABSTRACT

Data transmission system comprising a plurality of Local Area Networks (LANs) (10-1 to 10-4) interconnected by a hub (12) including the same plurality of LAN adapters (16-1 to 16-4) respectively connected to the LANs and a packet switch (14) interconnecting all LAN adapters wherein a packet transmitted by any adapter to the packet switch includes a header containing at least the address of the adapter to which the packet is forwarded. At each cross point is located a memory block for storing any data packet received from the input port corresponding to the cross point and which is to be forwarded to the output port corresponding to the cross point. The packet switch is composed of N×N identical packet switch modules with each of the packet switch modules being associated with m input ports and m output ports and comprises a rank selector which is programmed to provide a rank k from 0 to N−1 to each column of N modules corresponding to the same output ports, this rank being provided to all memory blocks of the column in order to shift the physical address of each output port in the column by an offset of k×m.

20 Claims, 9 Drawing Sheets

SELF-ROUTE MULTI-MEMORY PACKET SWITCH ADAPTED TO HAVE AN EXPANDABLE NUMBER OF INPUT/OUTPUT PORTS

BACKGROUND OF THE INVENTION

1. Field of the Invention

The present invention relates to the transmission of data packets such as ATM packets between Local Area Networks (LAN) interconnected by a switch engine and relates in particular to a data transmission system including a self-route multi-memory packet switch adapted to have an expandable number of input/output ports.

2. Background of the Invention

Local Area Networks (LAN) such as Ethernet or token-ring networks, are generally interconnected through hubs. The hub is a system made of LAN adapters that communicate together through a switch card containing a switch engine. Such a switch engine can be either a shared memory switch or a crossbar switch.

The shared memory switch is a device wherein the packets received by the input ports are stored into a memory at locations the addresses of which are determined by queues containing the packet destination addresses, the packets being transmitted on the output ports as the destination addresses are dequeued. Although such a switch enables a very low cell-lost rate, it presents a bottleneck due to the requirement of the memory bandwidth, the segregation of the buffer space and the centralized control of the buffer which causes the switch performance to degrade as the size of the switch increases. A traditional approach to design a large shared memory switch has been to first design a feasible size shared memory switch and then to interconnect a plurality of such modules in order to build a large switch. This general scheme of switch growth is known to cause degradation in performance of shared memory architecture as the switch grows in size insofar as the memory access controller will have to increase the number of all centralized control functions and memory operations thereby reducing drastically the access to the shared memory. A growable switch approach packet switch architecture is a plurality of shared memory switches organized in a single stage preceded by a buffer-less interconnection network. This approach does not allow global sharing of memory space along all of its inputs and outputs. It is known that this approach does not provide the best buffer utilization as possible for a buffer belonging to a group of output ports to overflow under unbalanced or bursty traffic conditions.

The other technique, the crossbar switch, does not use a shared memory to store the data packets. In such a switch, the data are stored in the adapters and the switching data connection is established by sending requests to a control module which determines whether it is possible to satisfy the requests taking into account an algorithm defining the best data connection to establish at each time.

BRIEF SUMMARY OF THE INVENTION

The main drawback of the prior art is that the use of a centralized control module must know the complete switching topology of the system and can become impossible to control when the switch grows in size. The growth in size and therefore the increase in the number of input and output ports requires redesign of the centralized control module.

It is clear from the above that a shared memory switch, such as a crossbar switch, also presents a bottleneck when there is a need to increase the number of input/output ports. Insofar as the two techniques include a centralized control of either the buffer in which are stored the data packets or the scheduling of the request processing, it is quasi-impossible to make a port expansion without redesigning the system.

Accordingly, the main object of the invention is to provide a packet switch wherein the number of input/output ports is easily expandable.

Another object of the invention is to provide a packet switch including an expandable number of packet switch modules enabling port expansion.

The invention relates therefore to a data transmission system comprising a plurality of Local Area Networks (LANs) interconnected by a hub including the same plurality of LAN adapters respectively connected to the LANs and a packet switch interconnecting all LAN adapters wherein a packet transmitted by any adapter to the packet switch includes a header containing at least the address of the adapter to which the packet is forwarded, the packet switch comprising a plurality of input ports and a same plurality of output ports both being respectively connected to the LAN adapters, each pair of input port and output port defining a cross point at which is located a memory block for storing any data packet received from the input port corresponding to the cross point and which is to be forwarded to the output port corresponding to the cross point. The packet switch is composed of N×N identical packet switch modules, each of the packet switch modules being associated with m input ports and m output ports and comprising a rank selector which is programmed to provide a rank k from 0 to N−1 to each column of N modules corresponding to the same output ports, this rank being provided to all memory blocks of the column in order to shift the physical address of each output port in the column by an offset of k×m.

BRIEF DESCRIPTION OF THE SEVERAL VIEWS OF THE DRAWINGS

The above and other objects, features and advantages of the invention will be better understood by reading the following more particular description of the invention in conjunction with the accompanying drawings.

DETAILED DESCRIPTION OF THE INVENTION

Figure 1:
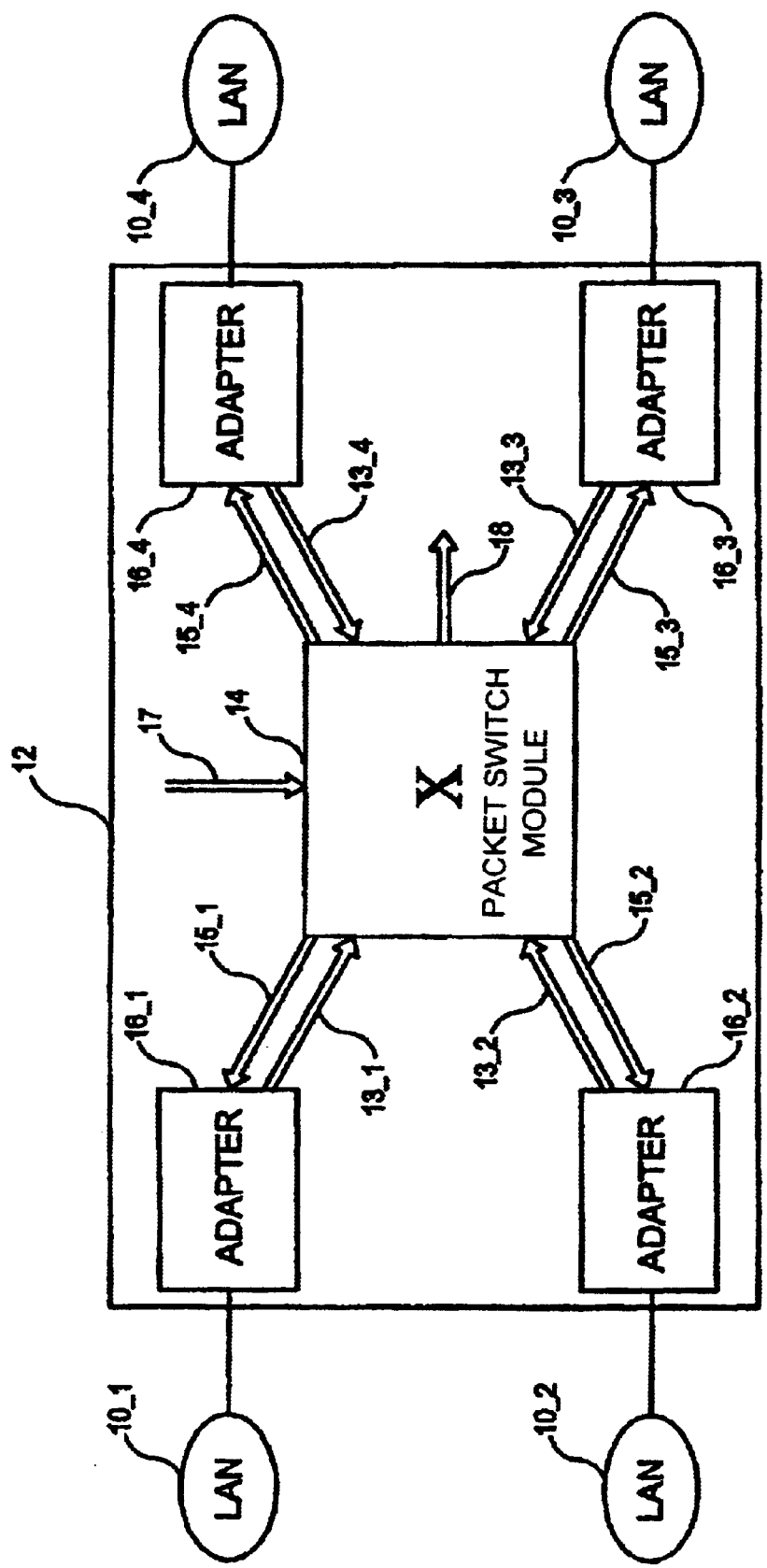
FIG. 1 is a schematic block diagram of a data transmission system including four LANs interconnected by a hub according to the principles of the invention.

The invention is implemented in an environment illustrated in FIG. 1 wherein a plurality of Local Area Networks (LAN) 10-1, 10-2, 10-3, 10-4 are interconnected together by hub 12 including packet switch 14. The Local Area Networks may be of the type ATM, Ethernet, or token-ring. Each LAN is connected to packet switch 14 in hub 12 by means of LAN adapter 16-1 for LAN 10-1, 16-2 for LAN 10-2, 16-3 for LAN 10-3 and 16-4 for LAN 10-4. Each adapter 16-1 to 16-4 is connected to packet switch 14 by means of data bus in 13 (bus 13-1 to 13-4) and data bus out 15 (bus 15-1 to 15-4). Connected to packet switch 14 are input expansion bus 17 and output expansion bus 18 which are respectively used for increasing the number of input ports and the number of output ports as explained hereafter.

Data bus in 13 carries the data packets coming from the input adapter and data bus out 15 carries the outgoing data packets to the output adapter. As explained hereafter, each incoming packet includes a self-routing header inserted by the adapter, this header being used to independently process the data packet through the different stages of the switch module.

Figure 2:
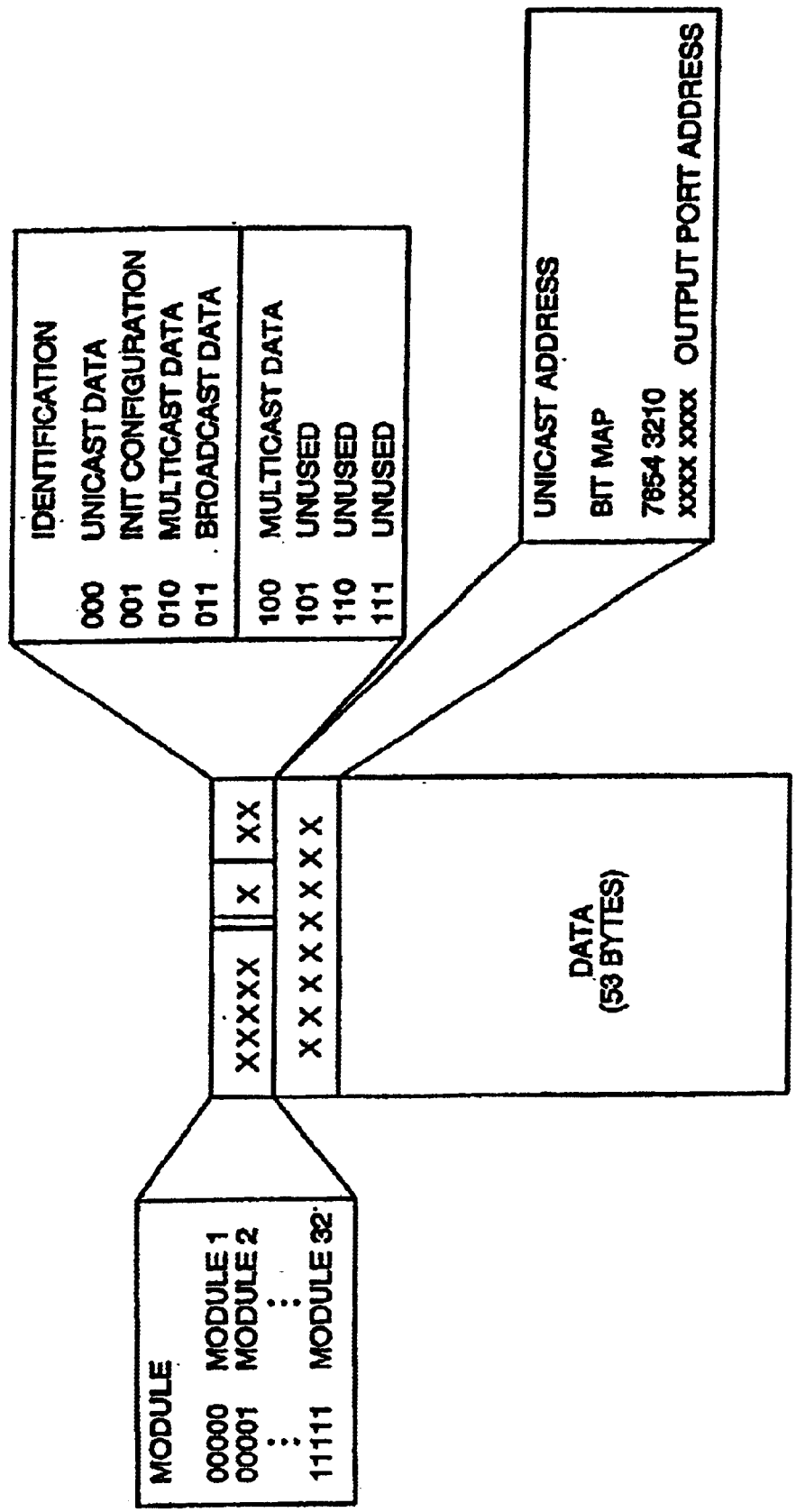
FIG. 2 represents schematically a data packet with the header of two bytes added by the adapter which is transmitted through a packet switch according to the invention.

FIG. 2 represents the format of the data packets exchanged between the LAN adapters through the packet switch. It is assumed that the data are packets of 53 bytes. A header of 2 bytes is added to each packet by the adapter. The first byte of the header is composed of an identification field of three bits (bits 0–2) and a module address field of 5 bits (bits 3–7). The second byte of the header is used in the unicast configuration and gives in bit map the destination output port selection.

General Data Flow Structure

Figure 3:
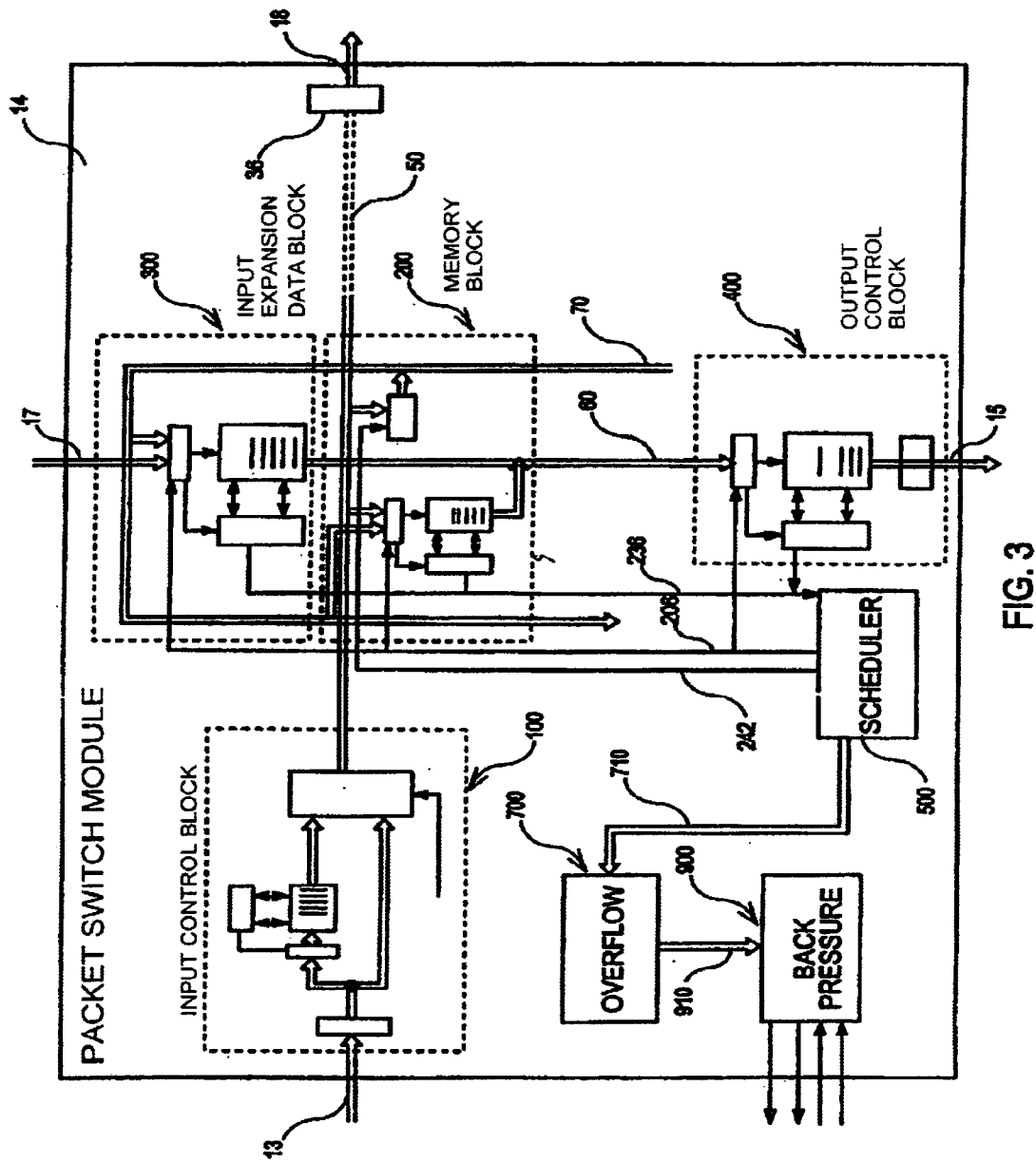
FIG. 3 is a block diagram representing the features of the packet switch being used in the packet data flow.

In reference to FIG. 3, the general data flow structure of packet switch module 14 according to the invention, is composed of a plurality of input bus like data bus in 13 respectively connected to the input ports of the switch and a plurality of output bus like data bus out 15 respectively connected to the output ports of the switch.

For each cross point such as the cross point defined by data bus in 13 and data bus out 15, there are an input control block 100, a memory block 200, an input expansion data block 300 and an output control block 400. Input control block 100 is common for all memory blocks which correspond to data bus in 13 and output control block 400 is common for all memory blocks which correspond to data bus out 15. Input expansion data block 300 is connected to input expansion bus 17 and is common to all memory blocks which correspond to data bus out 15. All the memory blocks corresponding to data bus in 13 are connected to a distributed data bus 50 itself connected to output expansion bus 18 by means of a gale 36. All the memory blocks corresponding to data bus out 15 are connected to output data bus 60 and to overflow data bus 70, the function of which will be explained later.

The data packets which are received by each memory block 200 from input control block 100 are analyzed and stored into memory, and are then released to output control block 400 through output data bus 60. Then, the data packets are sent by output control block 400 over data bus out 15. All these operations are synchronized and controlled by scheduler 500 within output control block 400 by means of control lines such as lines 206, 236 and 242.

Figure 4:
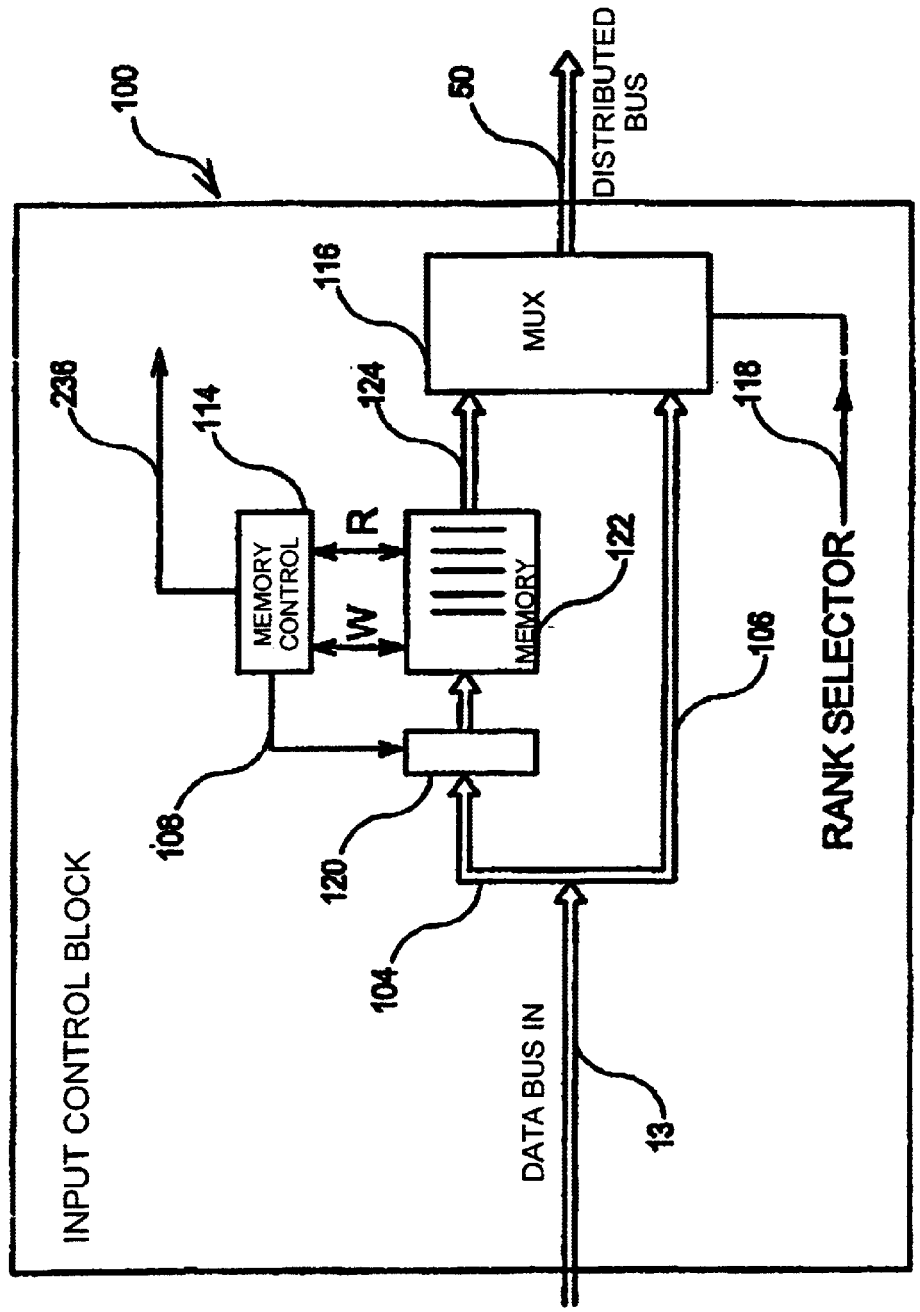
FIG. 4 is a block diagram representing an input control block of the packet switch.

As illustrated in FIG. 4, input control block 100 comprises principally data bus in 13 for receiving data packets and means for storing the incoming data packets according to their destination and releasing these packets into distributed data bus 50. Such means include buffer 120 for buffering and validating the data packet received from input bus 104 and input memory unit 122 for storing the data packets under the control of memory control block 114. The input memory unit is preferably a memory adapted to store a plurality of data packets, the write signal being sent by memory control block 114 after validation of the data in buffer 120. When a data packet is forwarded over distributed bus 50, a read signal is sent to memory control block 114 enabling memory control block 114 to know the filling level of input memory unit 122. Assuming that input memory unit 122 is full, the data packet within buffer 120 is not allowed to be transferred into input memory unit 122 and an overflow signal is forwarded to a scheduler on line 236 as described hereafter.

As described later, several modules can be grouped together to constitute the packet switch. For this, it is necessary to have multiplexer 116 between data bus in 13 and distributed data bus 50. Input control signal 118 coming from rank selector 800 determines the selection of the input to the multiplexer. In case of several switch modules, only the data packets received by the first module must be buffered to avoid the risk of overflow. In such a case, the multiplexer input selected by control signal 118 is the output of input memory unit 122 for the module 0 wherein data bus in 13 and following bus 106 is directly connected to distributed data bus 50 by multiplexer 116 for the subsequent modules. Note that the output of input memory unit 122 is also selected if there is only one switch module in packet switch 14.

Figure 5:
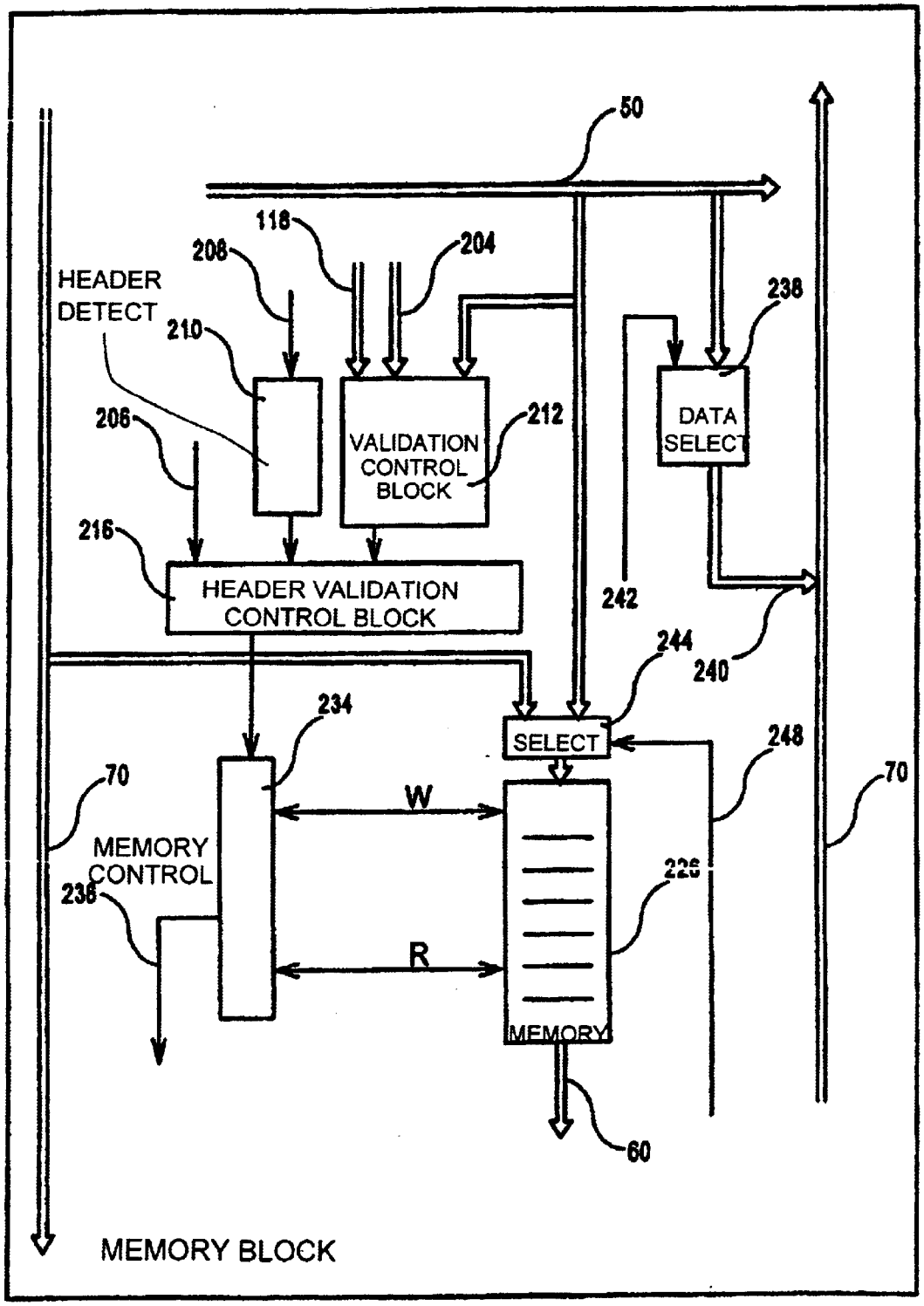
FIG. 5 is a block diagram representing a memory block located at each cross point of the packet switch.

FIG. 5 shows memory block 200 consisting of header detection block 210, header configuration setting and validation control block 212, header validation control block 216, data memory unit 226, memory controller 234, overflow connection block 238, and memory select block 244. Header configuration setting and validation control block 212 has the functions of storing the module rank from rank selector 800, storing the configuration data memory address from configuration interface mechanism 600, analyzing the data packet type (Multicast, Unicast, etc.), and authorizing (or not) the reception of the incoming data packet according to the destination data packet address.

a) At initialization time, header configuration setting block 212 receives the switch module rank from rank selector 800 through bus 118. The module rank is needed for determining the global physical address of each output port of the switching system. Each header configuration-setting block attached to the same column output port has the same decoding address. Assuming that each switch module is an 8×8 port module, the $1^{st}$ column corresponding to the output port 1 has the decoding address '0'; the $2^{nd}$ column has the decoding address '1' and so on until the column 8. Note that the switch module could be an m×m port module with m different from 8.

If the switch module is single, then the decoding address on each column is unchanged. But, in port expansion with several modules interconnected together, the $1^{st}$ column of modules has to decode the address range (0–7), the $2^{nd}$ column of modules has to decode the address range (8–15), the $3^{rd}$ column of modules has to decode the range address (16–23), and so on until the last column of modules. If there are n columns of modules, the block 212 assigns an offset of 8×k to the output port address in the module, with k being 0 to n−1.

b) The second function of the header configuration and setting block 212 allows modifications of the pre-set internal output port memory address through the configuration interface. This function is used in internal speed expansion mode, where 2 or more output ports or columns have to be combined in order to grow the data throughput of the port.

Configuration interface mechanism 600 configures the memory block through configuration bus 204.

c) The third function of the header configuration and setting block 212 is to detect whether the packet is a multicast address packet. If so, the header of the packet has a specific configuration determining that all the following packets, which have all a specific header, are the packets of a multicast frame. In such a case, header configuration and setting block 212 analyzes also the 54 bytes of the packet following the header to determine whether the output port associated with the memory block corresponds to one of the output ports to which the multicast frame is addressed.

d) Header detection block 210 defines the start of each incoming data packet. This block receives clocking signal through the signal 208 at each clock time.

e) Header validation control block 216 uses control signals from block 212, block 210, and validation signal 206 from scheduler 500, to authorize memory controller 234 to store the incoming data packet into data memory unit 226.

f) Memory select block 244 selects either distributed data bus 50 or overflow data bus 70 depending on control signal 248 driven by scheduler 500. By default, distributed data bus 50 is connected to data memory unit 226 until an overflow is detected.

g) Data memory unit 226 stores and releases the data packets under the control of memory controller 234.

h) Data Memory controller 234 performs the functions of controlling the address release, enqueue and dequeue mechanisms, generating read and write signals, and generating memory overflow signal 236 to scheduler 500.

i) Overflow data bus 70 (one per output), is connected to all memory blocks, along internal output data bus 60 in order to reassign the overflow data packet to another memory block. For this, scheduler 500 activates signal 242 controlling overflow connection block 238 which can be an AND circuit connecting distributed data bus 50 to overflow data bus 70 through bus 240. Scheduler 500 takes the decision after receiving flow controls signals 236 from memories connected on the same output port. The decision is to determine the usable memory wherein the overflow data packet can be stored. This is particularly useful, because the data packet is re-routed to another memory block of the same output port.

Figure 6:
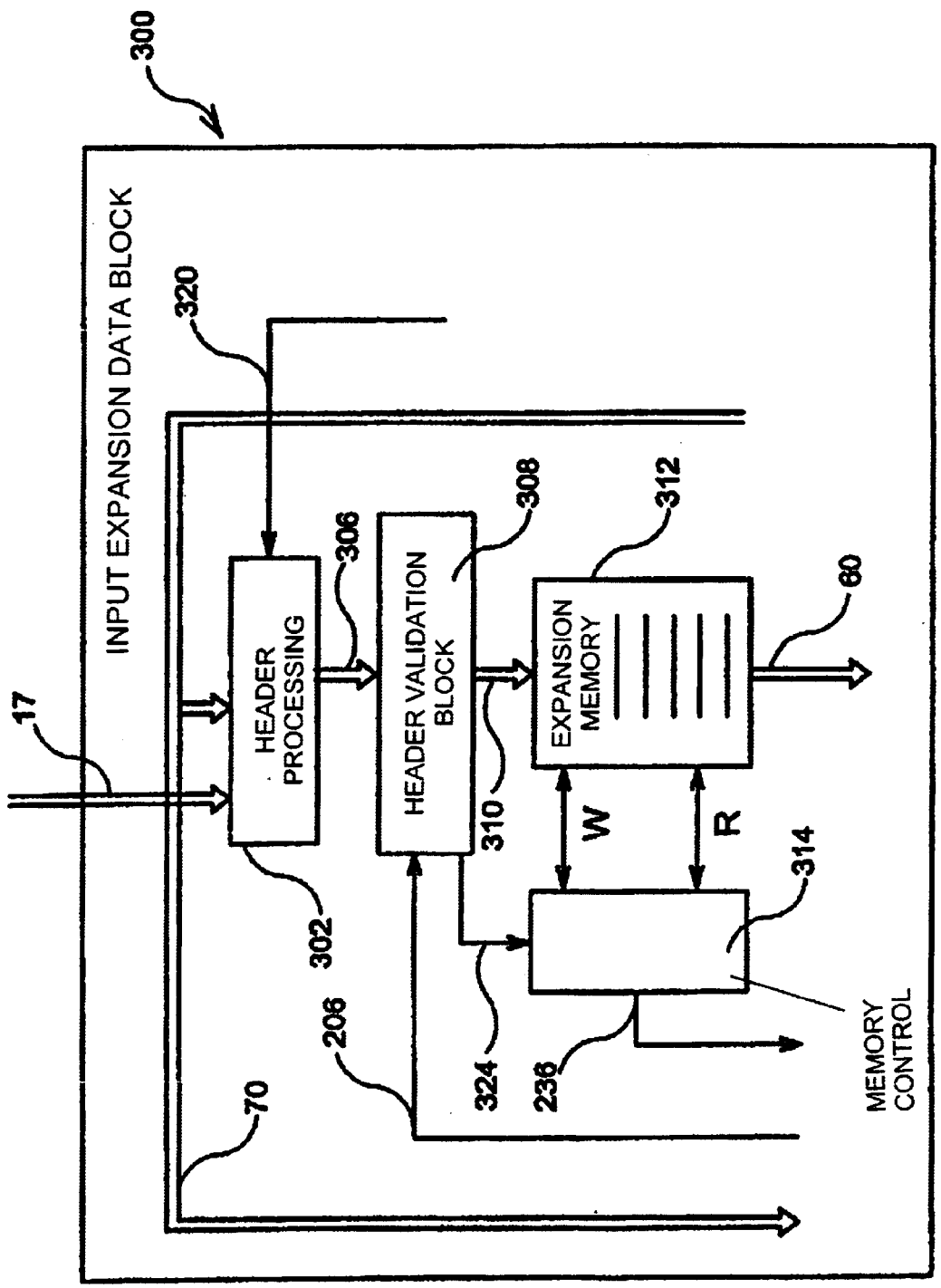
FIG. 6 is a block diagram representing an input expansion data block of the packet switch.

Input expansion data block 300 consists of header processing block 302, header validation block 308, expansion memory unit 312, and memory controller 314 as shown in FIG. 6. Input expansion bus in 17 connected to header processing block 302 carries the data packet coming from another switching module in expansion mode. Header processing block 302 is also connected to overflow data bus 70 for receiving an overflow data packet. Header processing module 302 is connected to header validation block 308 by data bus 306. The function of header processing block 302 is to select the appropriate darn bus, according to the configuration mode line 320 from rank selector 800. This line carries the necessary module rank information.

The header validation block 308 receives control signal validation 206 coming from the scheduler 500. Header validation block 308 signals an incoming data packet to memory controller 314 through control signal 324 and sends the data packet to expansion memory unit 312 through data bus 310.

The main function of expansion memory unit 312 is to store the incoming data packet coming from the expansion data bus or from the overflow data bus, under the control of memory controller 314 which controls the write/read operations to the memory, and generates memory flow control signal 236 to scheduler 500.

Figure 7:
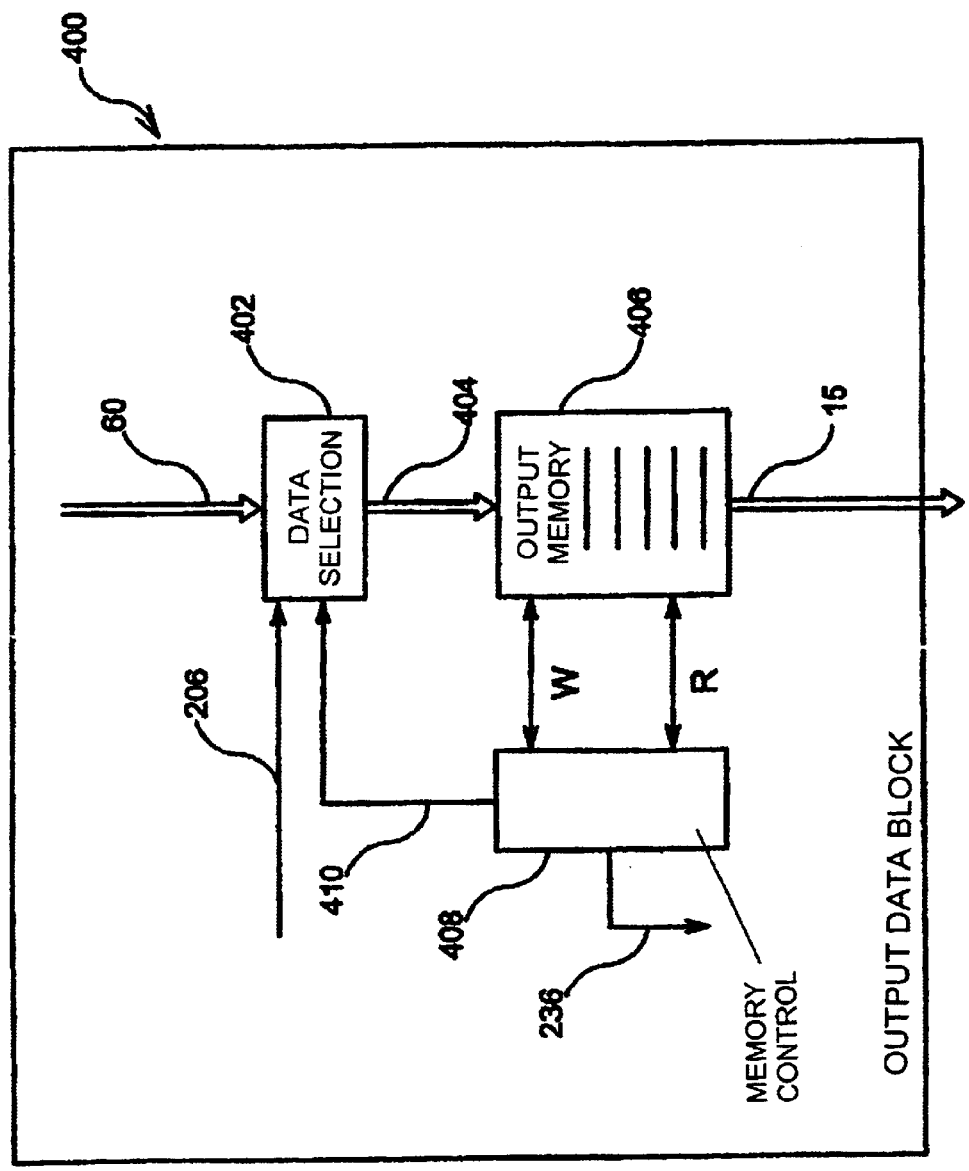
FIG. 7 is a block diagram representing an output data block of the packet switch.

Output data block 400 which consists of data selection block 402, output memory unit 406, and memory controller 408 is shown in FIG. 7. The function of output data block 400 is to receive data packets from internal output bus 60, to validate data packets from internal output bus 60, to store into output memory unit 406 the incoming data, and to release data packet on data bus out 15.

The function of data selection block 402 is to receive internal output data bus 60, to validate the incoming data packet when receiving validation signal 206 coming from scheduler 500, and to activate validation data signal 410 to memory controller 408.

Output memory unit 406 connected to data selection block 402 by data bus 404, stores incoming data packets under the control of memory controller 408. The function of the latter is to store the incoming data packets into the memory block 406, to release data packets from the output memory unit, to control the storing memory address, and to generate flow control signal 236 to scheduler 500.

The data packets after being released from output memory unit 406 by the memory controller, are sent over output data bus 15.

Scheduler (500)

Figure 8:
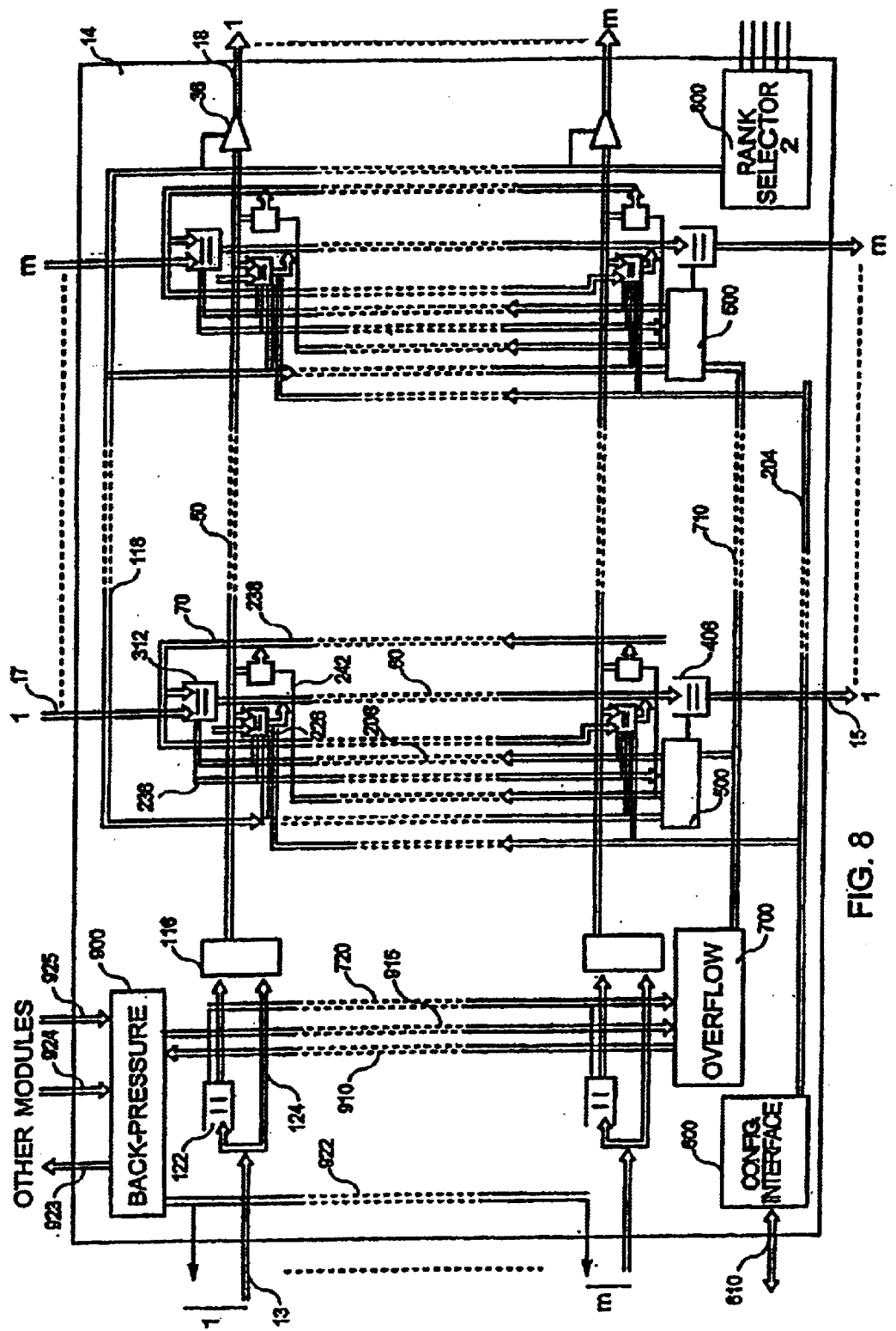
FIG. 8 is a block diagram representing the complete architecture of the packet switch.

An essential feature of the invention is to use a scheduler, as illustrated in FIG. 3 and FIG. 8, for each output port of the packet switch rather than a centralized scheduling mechanism as in a crossbar switch.

The main functions of scheduler 500 include receiving the necessary information coming from all attached column memory blocks 200, activating the validation of the incoming data packet for the selected memory block, determining the outgoing data packet by choosing the memory block according to a round-robin mechanism which can be based on priority selection and/or any other selections, controlling the memory overflow, flow controlling the output ports, and reporting flow control signals 710 to overflow control mechanism 700 and therefore alerting back pressure mechanism 900.

Rank Selector (800)

Rank selector 800 located in the bottom right corner of FIG. 8 is a mechanism using a number of input pins hardwired on the board, that define the module rank in a packet switch including a plurality of N×N switch modules.

In the case of single module, this address is '0'. In the case of port expansion, many switch modules may interconnect together. For the ease of comprehension, it is assumed a 16×16 switch system configuration using four 8×8 switch modules. The 2 modules of the $1^{st}$ column of modules have to be hardwired to '0'. The 2 other modules of the $2^{nd}$ column of modules have to be hardwired to '1'. The same algorithm applies for an N×N switch system configuration.

The physical destination address known by the adapters is the final destination address and is contained in the header of each of the data packets.

Overflow Control

Based upon the overflow signals coming from all memory blocks on lines 236 as illustrated in FIG. 3 and FIG. 8, the scheduler determines the memory blocks which overflow during each data packet time (internal clock time for storing one data packet).

Figure 9:
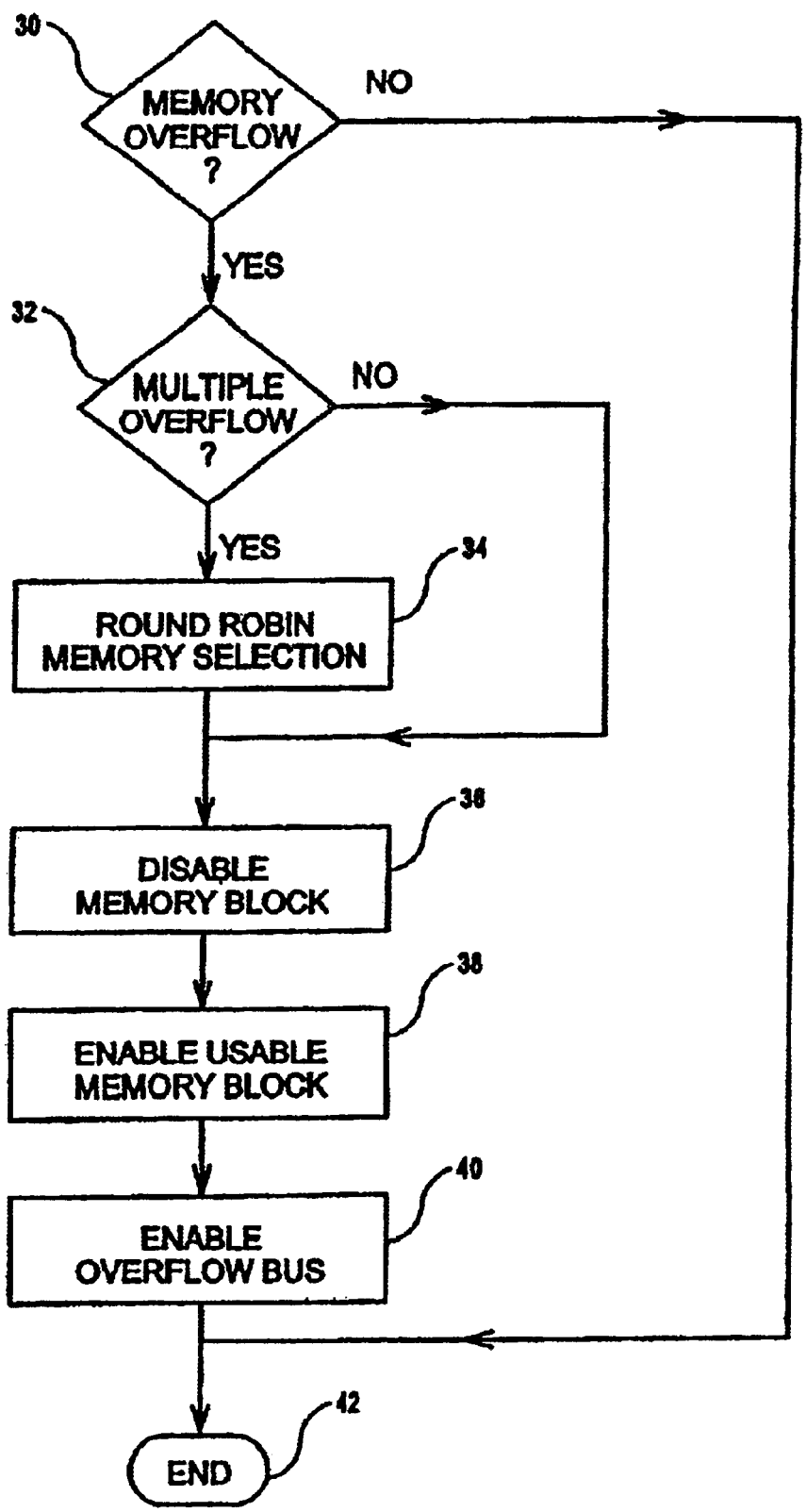
FIG. 9 is a flow chart representing the steps controlled by the scheduler when a single or multiple overflow occurs.

As illustrated by the flow chart of FIG. 9, the scheduler first checks whether there is a memory block which overflows (step 30). If so, it is then checked whether it is a multiple overflow (step 32). In case of multiple overflows, the scheduler uses a selection algorithm (generally a round robin selection) to select the appropriate memory block which can receive the next data packet (step 34). Of course, if it is a single overflow, the step of memory selection is not necessary. In such a case or after the selection, the memory block which overflows is disabled by the scheduler on line 206 (step 36) and a usable memory block is enabled by the scheduler on line 248 (step 38). Then, overflow bus 70 is enabled by line 242 from the scheduler to carry the data packet into the data memory unit of the memory block which is validated by line 248 (step 40). When there is no memory overflow (step 30) or after the transfer of the data packet over overflow bus 70, the process is ended (step 42).

It must be noted that such an overflow processing by a scheduler associated with each output port presents the advantages of flow controlling the internal data, avoiding the loss of the data packet, having a better distribution of the data packets, and delaying the generation of a back pressure signal as described hereafter only when it is not possible to process the memory overflow normally.

Configuration Interface Mechanism (600)

The configuration interface mechanism 600 located on bottom left of FIG. 8 is the mechanism controlling the configuration of each column output port.

Assuming that the switch is an 8×8 output port, at the end of the Initialization, the $1^{st}$ column corresponding to the output port 1 has the decoding address '0'. The $2^{nd}$ column has the decoding address '1' and so on until the column 8. The configuration interface mechanism allows the traffic management to modify the address of each column. As an example the packet switch may have the following configuration:

Port_1: Decoding address '0'
Port_2: Decoding address '1'
Port_3: Decoding address '2'
Port_4: Decoding address '2'
Port_5: Decoding address '4'
Port_6: Decoding address '5'
Port_7: Decoding address '6'
Port_8: Decoding address '6'

This function is used to increase the Internal Speed. The Port_3 and Port_4 decode the same incoming data packet, which improves the performances of the adapter. The same applies as Port_7 and Port_8.

Configuration interface mechanism 600 sends information through bus 204 to the configuration setting and detection block 212 of each memory block of each output port (see FIG. 5). Configuration interface mechanism 600 receives information through bus 610 from traffic management. In the case of port expansion (several modules interconnected together), each module is connected to bus 610.

The traffic management delivers through bus 610 the information about the module physical address, the row/column physical address, and the modified address of the row/column data memory block. The traffic management accesses only one configuration interface 600 at a time.

Back-Pressure Mechanism (900)

The back-pressure mechanism 900 located in the top left corner of the FIG. 8, has the functions of receiving flow control bus 910 from overflow control block 700, generating flow control bus 915 to overflow control block 700, receiving flow control information on bus 924 from the right adjacent switch module, receiving flow control information on bus 925 from the bottom adjacent switch module, generating flow control information on bus 922 to the left adjacent switch module, and generating flow control information on bus 923 to the top adjacent switch module.

Of course, in a single module configuration there is no information exchanged with other modules. Bus 922, from back-pressure mechanism 900 connected to the input ports, is made of n independent signals, with one signal per input port.

The generation of a back-pressure signal to the adapters is to stop (or reduce) the flow of the data packets transmitted to the packet switch when there is too much overflow detected by one or several schedulers. The back-pressure signals are generated after receiving flow control information from overflow mechanism 700 through bus 910.

When a memory block is not able to store any more of the data packets, an overflow control signal is sent to the corresponding scheduler through bus 236. Each scheduler alerts overflow mechanism 700 through control bus 710. Overflow mechanism 700 receives overflow control signals from all schedulers and informs back-pressure mechanism 900 through bus 910 to back-pressure the corresponding adapters.

In port expansion configuration, back-pressure mechanism 900 receives overflow information from the right adjacent switch module, and from the bottom adjacent switch module, and back-pressure mechanism 900 generates overflow information to the top adjacent switch module.

When back-pressure mechanism 900 receives overflow information from the bottom adjacent switch module, back-pressure mechanism 900 informs overflow mechanism 700 through bus 915, which in turn alerts corresponding schedulers 500 through bus 710 and requests schedulers 500 to decrease the transmission of the data packets.

When back-pressure mechanism 900 receives overflow information from the right adjacent switch module, back-pressure mechanism 900 alerts the corresponding input adapters through bus 922 and requests the input adapters to decrease the transmission of the data packets.

Although specific embodiments of the present invention have been illustrated in the accompanying drawings and described in the foregoing detailed description, it will be understood that the invention is not limited to the particular embodiments described herein, but is capable of numerous rearrangements, modifications and substitutions without departing from the scope of the invention. The following claims are intended to encompass all such modifications.

What is claimed is:

1. Data transmission system having a plurality of Local Area Networks (LANs) interconnected by a hub including a plurality of LAN adapters respectively connected to the plurality of LANs, the data transmission system comprising:

a packet switch interconnecting the plurality of LAN adapters, wherein a packet transmitted by a first LAN adapter to the packet switch includes a header containing at least an address of a second LAN adapter to which the packer is forwarded, the packet switch which includes a plurality of N×N identical packet switch modules, each of the packet switch modules being associated with m input ports and m output ports having a rank selector which is hardwired to provide a rank k from 0 to N−1 to each column of N modules corresponding to the same output ports, the rank being provided to all memory blocks of the column in order to shift the physical address of each output port in the column by an offset of k×m, the input and output ports both being respectively connected to the plurality of LAN adapters, each pair of input port and output port defining a cross point at which is located a memory block for storing a data packet received from the input port corresponding to the cross point and which is to be forwarded to the output port corresponding to the cross point.

2. Data transmission system according to claim 1, wherein the memory block comprises a data memory unit for storing at least a data packet, a header validation control block for determining whether the header of a data packet received from the input port contains the address of the output port associated with the cross point, and a memory controller for storing the data packet into the data memory unit if the header contains the address of the output port and for reading the data packet to forward the data packet to the output port.

3. Data transmission system according to claim 2, wherein a scheduler is associated with each output port, the scheduler selecting at each clock time a memory block among all memory blocks corresponding to the output port and causing the memory block to forward the data packet stored in the data memory unit to the output port when predetermined criteria are met.

4. Data transmission system according to claim 3, further comprising a back-pressure mechanism which sends back-pressure signals to input adapters for requesting the input adapters to reduce the flow of the data packets transmitted to said packet switch when there is too much overflow detected by one or several schedulers of one of said switch modules.

5. Data transmission system according to claim 4, further comprising an overflow mechanism which receives overflow control signals from the schedulers of said packet switch when there is too much overflow and transmits an overflow signal to said back-pressure mechanism.

6. Data transmission system according to claim 1, further comprising an input control block connected to each input port for buffering a data packet received from said input port before transmitting said data packet over a distributed data bus connected to all memory blocks corresponding to said input port, said input control block including an input memory unit for buffering said data packet received from said input port and a first memory controller for storing said data packet into said input memory unit and reading said data packer to forward it over said distributed data bus.

7. Data transmission system according to claim 6, wherein said input control block further includes a multiplexer for selecting either the output of said input memory unit or directly the bus connected to said input port when said input control block is not a first switch module of said packet switch.

8. Data transmission system according to claim 1, wherein a down stream switch module among said N×N identical packet switch modules includes for each output port an input expansion data block for buffering a data packet received from an expansion-bus-in connected to an up stream switch module and corresponding to the same output port as said output port of said down stream switch module.

9. Data transmission system according to claim 8, wherein said input expansion data block includes an expansion memory unit for buffering said data packet received from said expansion bus in and a second memory controller for storing said data packet into said expansion memory unit and reading said expansion memory unit to forward it to said output port of said down stream switch module.

10. Data transmission system according to claim 1, wherein said header of the data packet includes two bytes in which the first byte contains an identification field (unicast, multicast) and the second byte contains a module address field when said packet switch comprises several packet switch modules.

11. Data transmission system having a plurality of Local Area Networks (LANs) interconnected by a hub including a plurality of LAN adapters respectively connected to the plurality of LANs, the data transmission system comprising:

a packet switch interconnecting the plurality of LAN adapters, wherein a packet transmitted by a first LAN adapter to the packet switch includes a header containing at least an address of a second LAN adapter to which the packet is forwarded, the packet switch which includes a plurality of N×N identical packet switch modules, each of the packet switch modules being associated with m input ports and m output ports having a rank selector which is hardwired to provide a rank k from 0 to N−1 to each column of N modules corresponding to the same output port, the rank being provided to all memory blocks of the column in order to shift the physical address of each output port in the column by an offset of k×m, the input and output ports both being respectively connected to the plurality of LAN adapters, each pair of input port and output port defining a cross point at which is located a memory block for storing a data packer received from the input port corresponding to the cross point and which is to be forwarded to the output port corresponding to the cross point, wherein the memory block comprises a data memory unit for storing at least a data packet, a header validation control block for determining whether the header of a data packet received from the input port contains the address of the output port associated with the cross point, and a memory controller for storing the data packet into the data memory unit if the header contains the address of the output port and for reading the data packet to forward the data packet to the output port;

a scheduler associated with each output port, the scheduler selecting at each clock time a memory block among all memory blocks corresponding to the output port and causing the memory block to forward the data packet stored in the data memory unit to the output port when predetermined criteria are met;

an overflow mechanism which receives overflow control signals from the schedulers of said packet switch when there is too much overflow and transmits an overflow signal to paid back-pressure mechanism; and a back-pressure mechanism which sends back-pressure signals to input adapters for requesting the input adapters to reduce the flow of the data packets transmitted to said packet switch when there is too much overflow detected by one or several schedulers of one of said switch modules;

wherein said back-pressure mechanism receives overflow control signals from a right adjacent switch module and from a bottom adjacent switch module.

12. Data transmission system according to claim 11, wherein said back-pressure mechanism informs said overflow mechanism which alerts the corresponding schedulers and requests the corresponding schedulers to decrease the transmission of the data packets when said overflow mechanism receives overflow control signals from the bottom adjacent switch module.

13. Data transmission system according to claim 12, wherein said back-pressure mechanism alerts the input adapters of the corresponding switch module and requests the input adapters to decrease the transmission of the data packets when said back-pressure mechanism receives overflow control signals from the right adjacent switch module.

14. Data transmission system having a plurality of Local Area Networks (LANs) interconnected by a hub including a plurality of LAN adapters respectively connected to the plurality of LANs, the data transmission system comprising:

a packet switch interconnecting the plurality of LAN adapters, wherein a packet transmitted by a first LAN adapter to the packet switch includes a header containing at least an address of a second LAN adapter to which the packet is forwarded, the packet switch which includes a plurality of N×N identical packet switch modules, each of the packet switch modules being associated with m input ports and m output ports having a rank selector which is hardwired to provide a rank k from 0 to N−1 to each column of N modules corresponding to the same output ports, the rank being provided to all memory blocks of the column in order to shift the physical address of each output port in the column by an offset of k×m, the input and output ports both being respectively connected to the plurality of LAN adapters, each pair of input port and output port defining a cross point at which is located a memory block for storing a data packet received from the input port corresponding to the cross point and which is to be forwarded to the output port corresponding to the cross point, wherein each down stream switch module among said N×N identical packet switch modules includes for each output port an input expansion data block for buffering a data packet received front an expansion bus in connected to an up stream switch module and corresponding to the same output port as said output port of said down stream switch module.

15. Data transmission system according to claim 14, wherein the memory block comprises a data memory unit for storing at least a data packet, a header validation control block for determining whether the header of a data packet received from the input port contains the address of the output port associated with the cross point, and a memory controller for storing the data packet into the data memory unit if the header contains the address of the output port and for reading the data packet to forward the data packet to the output port.

16. Data transmission system according to claim 15, wherein a scheduler is associated with each output port, the scheduler selecting at each clock time a memory block among all memory blocks corresponding to the output port and causing the memory block to forward the data packet stored in the data memory unit to the output port when predetermined criteria are met.

17. Data transmission system according to claim 14, wherein said input expansion data block includes an expansion memory unit for buffering said data packet received from said expansion bus in and a second memory controller for storing said data packet into said expansion memory unit and reading said expansion memory unit to forward it to said output port of said down stream switch module.

18. Data transmission system according to claim 14, further comprising a back-pressure mechanism which sends back-pressure signals to input adapters for requesting the input adapters to reduce the flow of the data packets transmitted to said packet switch when there is too much overflow detected by one or several schedulers of one of said switch modules.

19. Data transmission system according to claim 18, further comprising an overflow mechanism which receives overflow control signals from the schedulers of said packet switch when there is too much overflow and transmits an overflow signal to said back-pressure mechanism.

20. Data transmission system according to claim 14, wherein said header of the data packet includes two bytes in which the first byte contains an identification field (unicast, multicast) and the second byte contains a module address field when said packet switch comprises several packet switch modules.

* * * * *